United States Patent Office 2,843,585
Patented July 15, 1958

2,843,585

3-ARALKYL-2-OXAZOLIDONES AND 3-ARALKYL-2-PENTOXAZOLIDONES AND THEIR SYNTHESIS

Alexander R. Surrey, Albany, N. Y., assignor to Sterling Drug Inc., New York, N. Y., a corporation of Delaware No Drawing. Application March 15, 1954
Serial No. 416,401

16 Claims. (Cl. 260—244)

This invention relates to 3-aralkyl-2-oxazolidones and 3-aralkyl-2-pentoxazolidones, and to the synthesis of these compounds.

The compounds of my invention have the general formula

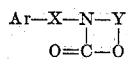

where Ar is a phenyl radical substituted by from one to three radicals selected from the group consisting of halogen, lower alkyl, amino, hydroxy, lower alkoxy, lower alkylmercapto, lower alkylsulfonyl and nitro, X is a lower alkylene radical having one to four carbon atoms and Y is a lower alkylene radical having two to six carbon atoms and having its two free valence bonds separated by from two to three carbon atoms, that is, alpha,beta-alkylene radicals and alpha,gamma-alkylene radicals. These compounds have valuable pharmacological properties, for instance, analgesic and antipyretic activities.

The substituents of the radical Ar can be in any of the available positions of the Ar nucleus, and where more than one substituent, they can be the same or different and can be in any of the various position combinations relative to each other. The halo substituents include chloro, bromo, iodo and fluoro. The lower alkoxy, lower alkyl, lower alkylmercapto and lower alkylsulfonyl substituents have preferably one to six carbon atoms, including for instance: methoxy, ethoxy, methylenedioxy, ethylenedioxy, n-propoxy, isopropoxy, isobutoxy, n-amoxy, n-hexoxy, and the like, when lower alkoxy; methyl, ethyl, n-propyl, isopropyl, n-butyl, isobutyl, 2-butyl, n-amyl, n-hexyl, and the like, when lower alkyl; methylmercapto, ethylmercapto, n-propylmercapto, isobutylmercapto, n-hexylmercapto, and the like, when lower alkylmercapto; methylsulfonyl, ethylsulfonyl, n-propylsulfonyl, isobutylsulfonyl, n-hexylsulfonyl, and the like, when lower alkylsulfonyl.

The lower alkylene radical X has one to four carbon atoms, and includes such examples as —CH₂—,

—CH₂CH₂—

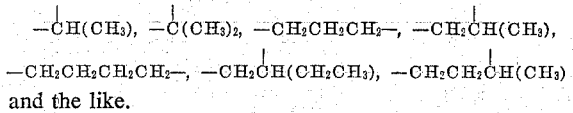

and the like.

The alpha,beta- or alpha,gamma-alkylene radical Y has two to six carbon atoms, and includes such examples as —CH₂CH₂—, —CH(CH₃)CH₂—,

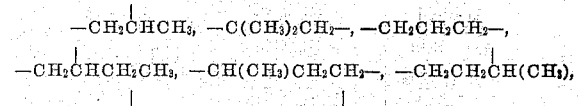

and the like.

The compounds of my invention were prepared by treating an aralkylaminoalkanol Ar—X—NH—Y—OH with an ester of trichloroacetic acid or a trichloroacetyl halide, where Ar, X and Y have the meanings given above. In using a trichloroacetate ester, the nature of the alcohol moiety is of no great consequence and can be varied at will since it is eliminated during the reaction. From the standpoint of economy and availability, however, the lower alkyl and phenyl esters were found most satisfactory. When a lower alkyl trichloroacetate was used, the methyl or ethyl esters were preferred because of their ease of preparation and ready availability, however, other lower alkyl esters are satisfactory for the purpose. The preparation was run at room temperature or by heating at temperatures up to 100° C., in the presence or absence of a solvent. Excellent yields were obtained by heating the reactants on a steam bath for about two hours or at about 50–60° C. for about six to eight hours. Comparable yields were obtained by allowing the reactants to stand together at room temperature, preferably with stirring, for several days to about two weeks. Of course, the reaction can be run at temperatures higher than 100° C., although this is unnecessary, uneconomical and results in a product that is less easily purified than one obtained by carrying out the reaction at a lower temperature. A less preferred procedure involves the treatment of an aralkylaminoalkanol in an inert solvent, e. g., ethylene dichloride, with a trichloroacetyl halide, preferably the chloride, at low temperature, e. g., below 5° C., in the presence of an equivalent quantity of a base, e. g., sodium hydroxide. Illustrations of the process of my invention are: the preparation of 3-(2,4-dichlorobenzyl)-2-oxazolidone by reacting 2-(2,4-dichlorobenzylamino)-ethanol with methyl trichloroacetate; the preparation of 3-[2-(4-n-butoxyphenyl)ethyl]-2-pentoxazolidone by reacting 3-[2-(4-n-butoxyphenyl)ethylamino]propanol with phenyl trichloroacetate; the preparation of 3-(3,4-dibromobenzyl)-5-methyl-2-oxazolidone by reacting 1-(3,4-dibromobenzylamino)-2-propanol with n-propyl trichloroacetate; and the preparation of 3-(4-chlorobenzyl)-2-oxazolidone by reacting 2-(4-chlorobenzylamino)ethanol with trichloroacetyl chloride.

The aralkylaminoalkanols of the formula

were prepared preferably by one of two procedures: reaction of an aralkyl halide, Ar-X-halogen, with an alkanolamine, H₂N—Y—OH; and, for compounds where X is CH₂, reaction of an aldehyde, Ar—CHO, with an alkanolamine, H₂N—Y—OH, and subsequent catalytic hydrogenation of the resulting anil, Ar—CH=N—Y—OH. Alternatively, a third method of preparing these aralkylaminoalkanols is the reaction of an aralkylamine,

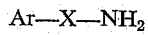

with a haloalkanol, halogen—Y—OH. These intermediate aralkylaminoalkanols are also disclosed in my copending applications Serial Nos. 411,551, now Patent No. 2,771,468, and 411,553, now abandoned, each filed February 19, 1954, and, in part, in my copending application Serial No. 329,447, filed January 2, 1953, now Patent No. 2,732,402.

The following examples will further illustrate specific embodiments of the invention without, however, limiting it thereto.

EXAMPLE 1

*(A) Aralkylaminoalkanols*

As pointed out above these intermediate compounds were prepared preferably by one of two procedures: the reaction of a benzaldehyde with an alkanolamine and catalytic hydrogenation of the resulting anil for the preparation of compounds where X is CH₂; and the reaction of an aralkyl halide with an alkanolamine. Illustrations of these procedures follow.

2-(4-isopropylbenzylamino)ethanol.—A mixture of 44.3 g. of 4-isopropylbenzaldehyde and 18.3 g. of ethanolamine was heated on a steam bath in vacuo for one hour. The mixture was dissolved in 125 ml. of hot ethanol and reduced catalytically with 0.5 g. of palladium chloride and 3.5 g. of charcoal at about two atmospheres of hydrogen. After the reduction had been completed, the catalyst was filtered off and the alcohol distilled under reduced pressure. The residue which solidified was recrystallized once from n-heptane and once from ether, yielding the product, 2-(4-isopropylbenzylamino)ethanol, M. P. 80.9–83.3° C. (corr.).

Analysis.—Calcd. for $C_{12}H_{19}NO$: C, 74.55; H, 10.12. Found: C, 74.53; H, 10.16.

2 - (4 - isopropylbenzylamino)ethanol hydrochloride melted at 129.4–132.2° C. (corr.) when recrystallized from ethanol-ether.

Analysis.—Calcd. for $C_{12}H_{19}NO \cdot HCl$: C, 62.74; H, 8.77; Cl, 15.44. Found: C, 63.00; H, 8.99; Cl, 15.62

Other benzylaminoethanols prepared by the above illustrated procedure are given in Table I.

TABLE I

R—⌬—CH$_2$—NH—CH$_2$CH$_2$OH

| R | Base, M. P., ° C. (corr.) | Hydrochloride, M. P., ° C. (corr.) |
|---|---|---|
| 4-OCH$_3$ | 38–39 | 112.2–113.6 |
| 4-OCH(CH$_3$)$_2$ | 75.0–76.6 | 134.9–135.4 |
| 4-OC$_2$H$_5$ | 63.0–63.6 | 103–104.6 |
| 4-OC$_3$H$_7$-n | 67–68.2 | 134.2–138.2 |
| 4-OC$_5$H$_{11}$-n | 51.9–55 | 144–145.5 |
| 3,4-O$_2$CH$_2$ | 62.6–64.4 | 152–152.6 |
| 4-OC$_4$H$_9$-n |  | 146.6–147.5 |

The following aralkylaminoalkanols were prepared by the reaction of an aralkyl halide with an alkanolamine.

2-(2,4-dichlorobenzylamino)ethanol.—78. g. of 2,4-dichlorobenzyl chloride was added dropwise with stirring to 80 g. of ethanolamine. After standing at room temperature overnight, the mixture was basified with 20% sodium hydroxide solution and extracted with ether. Removal of the ether and recrystallization of the residue with n-heptane gave 56 g. of 2-(2,4-dichlorobenzylamino)ethanol, melting at 62–62.8° C. (corr.).

Analysis.—Calcd. for $C_9H_{11}Cl_2NO$: Cl, 32.22. Found: Cl, 32.43.

Alternatively, this product was obtained directly in solid form by pouring the reaction mixture into a large volume of water and stirring.

2 - (2,4 - dichlorobenzylamino)ethanol hydrochloride melted at 184.7–186.7° C. (corr.).

Analysis.—Calcd. for $C_9H_{11}Cl_2NO \cdot HCl$: C, 42.12; H, 4.70; Cl, 13.80. Found: C, 42.30; H, 4.66; Cl, 13.78.

Other benzylaminoalkanols prepared by the above illustrated procedure for the preparation of 2-(2,4-dichlorobenzylamino)ethanol are given in Table II.

TABLE II

R—⌬—CH$_2$—NH—Y—OH

| R | Y | Base, B. P., ° C. | Hydrochloride, M. P., ° C. (corr.) |
|---|---|---|---|
| 3,4-di-Cl | CH$_2$CH$_2$ |  | 145.9–148.1 |
| 2-Cl | CH$_2$CH$_2$ |  | 135.2–136.9 |
| 4-Cl | CH$_2$CH$_2$ | 126–131 at 0.7 mm | 172.7–173.8 |
| 2,4-di-Cl | CH$_2$CH$_2$CH$_2$ | 150–155 at 0.5 mm |  |
| 3,4-di-Cl | CH$_2$CH$_2$CH$_2$ | 165–172 at 0.6–0.8 mm |  |
| 2,4-di-Cl | CH$_2$CH(CH$_3$) |  | 152.4–154.2 |

Other aralkylaminoalkanols can be prepared according to the procedures given above using the appropriate benzaldehyde or aralkyl halide and alkanolamine; such compounds include 2-(2,4-dibromobenzylamino)ethanol, 2-(3,4-diiodobenzylamino)ethanol, 2 - (4 - fluorophenethylamino)ethanol, 2 - (2,4-dichlorophenethylamino)ethanol, 2-[4-(2,4-dichlorophenyl)butylamino]ethanol, 2 - (3,4,5-trichlorobenzylamino)ethanol, 2 - (4-bromo-2-chlorobenzylamino)ethanol, 3-(2,4-difluorobenzylamino)butanol, 2-(4-n-hexoxybenzylamino)ethanol, 2-(4-isobutoxybenzylamino)ethanol, 2 - [2 - (3,4,5 - trimethoxyphenyl)ethylamino]hexanol, 3-(4-nitrobenzylamino)hexanol, 1-(4-nitrobenzylamino)-2-propanol, 3-(4-nitrobenzylamino)propanol, 2-(4-n-butylmercaptobenzylamino)ethanol, 2-(4-n-isobutylsulfonylbenzylamino)ethanol, and the like.

An illustration of an alternative method of preparing the intermediate aralkylaminoalkanols is the reaction of 2-(3,4-dimethoxyphenyl)ethylamine with ethylene chlorohydrin to form 2-[2-(3,4-dimethoxyphenyl)ethylamino]ethanol.

B. *3-aralkyl-2-oxazolidones and -2-pentoxazolidones*

The preparation of these compounds is illustrated by the following preparation of 3-(2,4-dichlorobenzyl)-2-oxazolidone: A mixture of 11 g. of N-(2,4-dichlorobenzylamino)ethanol and 9.6 g. of ethyl trichloroacetate was heated on a steam bath with stirring for two hours. The clear solution was dissolved in ethylene dichloride, washed with 2 N HCl, dried, filtered with decolorizing charcoal and the solvent removed in vacuo. The residual orange-brown oil was triturated with n-heptane and the solid that formed was collected, washed with n-pentane and recrystallized from benzene-n-pentane, yielding the product, 3-(2,4-dichlorobenzyl)-2-oxazolidone, M. P. 72.2–74.3° C. (corr.).

Analysis.—Calcd. for $C_{10}H_9Cl_2NO_2$: C, 48.82; H, 3.68; N, 5.69. Found: C, 48.80; H, 3.66; N, 5.69.

The foregoing reaction was also carried out by heating the reactants with stirring for four to eight hours on a steam bath and for eight hours at 50–60° C. with no appreciable changes in the yield. The reaction was also run at room temperature for about two days with comparable yields being obtained.

When the above procedure is followed but using methyl trichloroacetate or phenyl trichloroacetate in place of ethyl trichloroacetate, the same product, 3-(2,4-dichlorobenzyl)-2-oxazolidone, can be obtained. Alternatively, 3-(2,4-dichlorobenzyl)-2-oxazolidone can be prepared by treating N-(2,4-dichlorobenzylamino)ethanol in ethylene dichloride with trichloroacetyl chloride at 0°–5° C. in the presence sodium hydroxide.

Other 3-aralkyl-2-oxazolidones and -2-pentoxazolidones prepared according to the foregoing procedure are given in Table III.

TABLE III

R—⌬—CH$_2$—N—Y
           |   |
           O=C—O

| R | Y | M. P., ° C. (corr.) |
|---|---|---|
| 3,4-di-Cl | CH$_2$CH$_2$ | 68.0–69.6 |
| 4-Cl | CH$_2$CH$_2$ | 72.1–73.5 |
| 4-NO$_2$ | CH$_2$CH$_2$ | 148.0–150.3 |
| 2,4-di-Cl | CH$_2$CH(CH$_3$) | 75.4–77.6 |
| 3,4-O$_2$CH$_2$ | CH$_2$CH$_2$ | 59.3–62.2 |
| 4-OC$_2$H$_5$ | CH$_2$CH$_2$ | 63.4–66.1 |
| 2-Cl | CH$_2$CH$_2$ | 70.0–72.1 |
| 2,6-di-Cl | CH$_2$CH$_2$ | 115.8–118.1 |
| 2,4-di-Cl | CH$_2$CH$_2$CH$_2$ | 108.8–111.1 |
| 4-OC$_4$H$_9$-n | CH$_2$CH$_2$ | B. P. 170–175 at 0.04 mm. |
| 3,4-di-OCH$_3$ | CH$_2$CH$_2$ | 94.1–96.8 |
| 2,4-di-Cl | CH$_2$CH$_2$CH(CH$_3$) | 96.9–99.0 |
| 4-OC$_2$H$_5$ | CH$_2$CH$_2$CH$_2$ | 89.8–92.8 |
| 4-OCH$_3$ | CH$_2$CH$_2$CH$_2$ | 62.5–66.1 |
| 3,4-O$_2$CH$_2$ | CH$_2$CH$_2$CH$_2$ | 99.7–100.7 |
| 4-OH | CH$_2$CH$_2$ | 128.2–129.2 |
| 2-Cl | CH$_2$CH$_2$CH$_2$ | 75.6–76.8 |

Other 3-aralkyl-2-oxazolidones and -2-pentoxazolidones that can be prepared according to the procedure given above include: 3-(2,4-dibromobenzyl)-2-oxazolidone, 3-(3,4-diiodobenzyl)-2-oxazolidone, 3-(4-fluorophenethyl)-2-oxazolidone, 3-(2,4-dichlorophenethyl)-2-oxazolidone, 3 - [4 - (2,4 - dichlorophenyl)butyl] - 2 - oxazolidone, 3 - (3,4,5 - trichlorobenzyl) - 2 - oxazolidone, 3 - (4-bromo - 2 - chlorobenzyl) - 2 - oxazolidone, 3 - (2,4 - difluorobenzyl) - 4 - methyl - 2 - pentoxazolidone, 3 - (4-n - hexoxybenzyl) - 2 - oxazolidone, 3 - (4 - isobutoxybenzyl) - 2 - oxazolidone, 3 - [2 - (3,4,5 - trimethoxyphenyl)ethyl] - 4 - n - butyl - 2 - oxazolidone, 3 - (4-nitrobenzyl) - 4 - n - propyl - 2 - pentoxazolidone, 3 - (4-nitrobenzyl) - 5 - methyl - 2 - oxazolidone, 3 - (4 - nitrobenzyl) - 2 - pentoxazolidone, 3 - (4 - n - butylmercaptobenzyl) - 2 - oxazolidone, 3 - (4 - n - isobutylsulfonylbenzyl)-2-oxazolidone, and the like.

EXAMPLE 2

*3-(4-aminobenzyl)-2-oxazolidone*

A mixture of 26.5 g. of 3-(4-nitrobenzyl)-2-oxazolidone, 120 g. of iron filings, 5 ml. of acetic acid, 100 ml. of water and 400 ml. of ethanol was heated on a steam bath with vigorous stirring for two hours. Excess solid sodium carbonate was added and the mixture was filtered hot through a filter aid such as diatomaceous earth. Removal of the ethanol by distillation gave an oily residue. This was dissolved in chloroform and the resulting solution was dried over anhydrous potassium carbonate. The chloroform was removed under reduced pressure leaving 11.5 g. of 3-(4-aminobenzyl)-2-oxazolidone, M. P. 127.5–129° C. This product was dissolved in a minimum amount of acetone and treated with ethanolic hydrogen chloride. There was thus obtained 3-(4-aminobenzyl)-2-oxazolidone as its hydrochloride salt, which melted at 190.9–192.1° C. (corr.) when crystallized twice from ethanol.

*Analysis.*—Calcd. for $C_{10}H_{12}N_2O_2 \cdot HCl$: C, 52.52; H, 5.73; Cl$^-$, 15.50. Found: C, 52.70; H, 5.77; Cl$^-$, 15.69.

The 3-aralkyl-2-oxazolidones and 3-aralkyl-2-pentoxazolidones of the foregoing examples when administered intraperitoneally were found to reduce elevated temperatures of rats in which fever had been induced by a subcutaneous yeast suspension sixteen hours prior to injection of the compound. Doses of about 25 to 200 mg. per kg. of body weight were found to reduce the temperature of the fevered rats to normal. In addition to having this antipyretic activity my compounds were also found to have analgesic activity when evaluated by the rat thermal radiation test [J. Pharmacol. Exptl. Therap., 84, 301 (1945)].

I claim:

1. A compound having the formula $$\text{Ar–X–N–Y} \atop \text{O=C–O}$$

where Ar is a phenyl radical substituted by from one to three radicals selected from the group consisting of halogen, amino, hydroxy, lower alkyl, lower alkoxy, lower alkylmercapto, lower alkylsulfonyl and nitro, X is a lower alkylene radical having from one to four carbon atoms and Y is a lower alkylene radical having from two to six carbon atoms and having its valence bonds separated by from two to three carbon atoms.

2. A 3-(halogenated-benzyl)-2-oxazolidone having the formula $$\text{Ar–CH}_2\text{–N–Y} \atop \text{O=C–O}$$

where Ar is a phenyl radical substituted by from one to three halo radicals and Y is a lower alpha,beta-alkylene radical having from two to six carbon atoms.

3. A 3 - (alkoxylated - benzyl) - 2 - oxazolidone having the formula $$\text{Ar–CH}_2\text{–N–Y} \atop \text{O=C–O}$$

where Ar is a phenyl radical substituted by from one to three lower alkoxy radicals and Y is a lower alpha,beta-alkylene radical having from two to six carbon atoms.

4. A 3-(halogenated-benzyl)-2-pentoxazolidone having the formula $$\text{Ar–CH}_2\text{–N–Y} \atop \text{O=C–O}$$

where Ar is a phenyl radical substituted by from one to three halo radicals and Y is a lower alpha,gamma-alkylene radical having from three to six carbon atoms.

5. A 3-(dihalobenzyl)-2-oxazolidone having the formula $$\text{Ar–CH}_2\text{–N–––CH}_2 \atop \text{O=C} \quad \text{CH}_2 \atop \diagdown\text{O}\diagup$$

where Ar is a dihalophenyl radical.

6. A 3-(dihalobenzyl)-5-methyl-2-oxazolidone having the formula $$\text{Ar–CH}_2\text{–N–––CH}_2 \atop \text{O=C} \quad \text{CHCH}_3 \atop \diagdown\text{O}\diagup$$

where Ar is a dihalophenyl radical.

7. A 3-(monohalobenzyl)-2-oxazolidone having the formula $$\text{Ar–CH}_2\text{–N–––CH}_2 \atop \text{O=C} \quad \text{CH}_2 \atop \diagdown\text{O}\diagup$$

where Ar is a monohalophenyl radical.

8. A 3-(monoalkoxybenzyl)-2-oxazolidone having the formula $$\text{Ar–CH}_2\text{–N–––CH}_2 \atop \text{O=C} \quad \text{CH}_2 \atop \diagdown\text{O}\diagup$$

where Ar is a mono-(lower alkoxy)phenyl radical.

9. A 3-(dihalobenzyl)-2-pentoxazolidone having the formula $$\text{Ar–CH}_2\text{–N} \diagup \text{CH}_3 \atop \diagdown\text{CH}_2 \atop \text{O=C} \quad \text{CH}_2 \atop \diagdown\text{O}\diagup$$

where Ar is a dihalophenyl radical.

10. 3-(2,4-dichlorobenzyl)-2-oxazolidone.

11. A process for the preparation of a compound having the formula $$\text{Ar–X–N–Y} \atop \text{O=C–O}$$

where Ar is a phenyl radical substituted by from one to three radicals selected from the group consisting of halogen, hydroxy, lower alkyl, lower alkoxy, lower alkylmercapto, lower alkylsulfonyl and nitro, X is a lower alkylene radical having one to four carbon atoms and Y is a lower alkylene radical having from two to six carbon atoms and having its valence bonds separated by from two to three carbon atoms, which comprises reacting a compound having the formula Ar—X—NH—Y—OH, with a compound selected from the group consisting of an ester or trichloroacetic acid and a trichloroacetyl halide.

12. A process for the praparation of a 3-(halogenated-benzyl)-2-oxazolidone having the formula

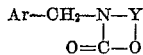

where Ar is a phenyl radical substituted by from one to three halo radicals and Y is a lower alpha,beta-alkylene radical having two to six carbon atoms, which comprises reacting a compound having the formula, Ar—CH$_2$—NH—Y—OH with a lower alkyl trichloroacetate.

13. A process for the preparation of a 3-(alkoxylated-benzyl)-2-oxazolidone having the formula

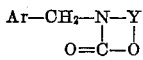

where Ar is a phenyl radical substituted by from one to three lower alkoxy radicals and Y is a lower alpha,beta-alkylene radical having two to six carbon atoms, which comprises reacting a compound having the formula, Ar—CH$_2$—NH—Y—OH, with a lower alkyl trichloroacetate.

14. A process for the preparation of a 3-(halogenated-benzyl)-2-pentoxazolidone having the formula

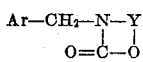

where Ar is a phenyl radical substituted by from one to three halo radicals and Y is a lower alpha,gamma-alkylene radical having three to six carbon atoms, which comprises reacting a compound having the formula, Ar—CH$_2$—NH—Y—OH with a lower alkyl trichloroacetate.

15. A process for the preparation of a 3-(dihalo-benzyl)-2-oxazolidone having the formula

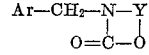

where Ar is a dihalophenyl radical and Y is a lower alpha,beta-alkylene radical having two to six carbon atoms, which comprises reacting a compound having the formula, Ar—CH$_2$—NH—Y—OH, with a lower alkyl trichloroacetate.

16. A process for the preparation of a 3-(dihalo-benzyl)-2-oxazolidone having the formula

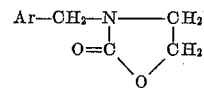

where Ar is a dihalophenyl radical, which comprises reacting a 2-(dihalobenzylamino)ethanol with methyl trichloroacetate.

References Cited in the file of this patent
UNITED STATES PATENTS

| | | |
|---|---|---|
| 2,617,825 | Wood | Nov. 11, 1952 |
| 2,656,328 | Caldwell | Oct. 20, 1953 |

OTHER REFERENCES

Endo: "Chem. Abst." (1951), vol. 45, pp. 6601–2.
Pierce et al.: "Jour. Am. Chem. Soc." (1923), vol. 45, pp. 790–5.

UNITED STATES PATENT OFFICE

CERTIFICATE OF CORRECTION

Patent No. 2,843,585  
July 15, 1958

Alexander R. Surrey

It is hereby certified that error appears in the printed specification of the above numbered patent requiring correction and that the said Letters Patent should read as corrected below.

Column 3, line 33, Table I, second column thereof, under the heading "Base", fourth listing, for "67-68 2" read -- 67-68.2 --; line 40, for "78. g." read -- 78.2 g. --; line 70, Table II, first column thereof, under the heading "R", fourth listing, for "2.4-di-Cl" read -- 2,4-di-Cl --; column 7, line 3, for "ester or" read -- ester of --.

Signed and sealed this 7th day of October 1958.

(SEAL)  
Attest:  
KARL H. AXLINE  
Attesting Officer

ROBERT C. WATSON  
Commissioner of Patents